United States Patent [19]

Yamashita

[11] 4,079,413

[45] Mar. 14, 1978

[54] PORTABLE ELECTRONIC TIMEPIECE WITH SELECTIVE DISPLAY OF TIME SIGNAL AND TELEVISION IMAGE

[75] Inventor: Shiro Yamashita, Tokyo, Japan

[73] Assignee: Kabushiki Kaisha Daini Seikosha, Japan

[21] Appl. No.: 709,289

[22] Filed: Jul. 28, 1976

[30] Foreign Application Priority Data

Jul. 29, 1975 Japan .................................. 50/92267
Aug. 7, 1975 Japan .................................. 50/96042
Aug. 25, 1975 Japan .................................. 50/102730

[51] Int. Cl.² ............................................. H04N 7/00
[52] U.S. Cl. ........................................ 358/83; 358/93; 358/180; 358/183; 358/241
[58] Field of Search ................... 358/83, 93, 180, 183, 358/230, 240, 241, 254; 340/324 AD; 325/16

[56] References Cited

U.S. PATENT DOCUMENTS 3,838,209  9/1974  Tsuchiya et al. ..................... 358/241
3,898,644  8/1975  Baxter .................................. 358/183
3,908,083  9/1975  Hiraki .................................. 358/180

OTHER PUBLICATIONS

Dick Tracy Comic Strip by Chester Gould, Washington Post, Apr. 26, 1964.

Primary Examiner—Richard Murray
Attorney, Agent, or Firm—Robert E. Burns; Emmanuel J. Lobato; Bruce L. Adams

[57] ABSTRACT

A portable electronic timepiece comprises time keeping circuitry, television receiver circuitry and an indicator grid which can selectively visually display a time signal or a television image either wholly or partially in magnified form. Switching means is provided for selecting between display of the time signal and display of the television image and for selecting a portion of the television image to be magnified and displayed. Means is provided for indicating on the normal video picture the position of the portion selected for enlargement and display.

5 Claims, 12 Drawing Figures

4,079,413

PORTABLE ELECTRONIC TIMEPIECE WITH SELECTIVE DISPLAY OF TIME SIGNAL AND TELEVISION IMAGE

BACKGROUND OF THE INVENTION

This invention relates to a portable electronic timepiece and, more particularly, to a portable electronic timepiece which is capable of selectively displaying a television video signal and the time according to a time keeper comprised therein and is further capable of selectively expanding a part of the image obtained by the video signal and of indicating the position of the part to be expanded with respect to the whole picture represented by the video signal.

When the image televised by television (TV) is displayed on a small sized indicator such as a wrist watch size, the picture is indistinct because of the small-size. In such a case, it is possible to perceive the information of the picture correctly only if a part of the picture is expanded. For instance, an image which indicates time can be displayed synchronously with the original image.

SUMMARY OF THE INVENTION

The object of the present invention is to provide a portable electronic timepiece which enables one to know the correct time by displaying that image portion of a television signal which indicates the time in the indicator, so that the time in the time keeper comprised therein can be suitably corrected and further enables one to select an expanded portion of the desired image of a television picture and to indicate its position on the normal video picture so as to judge easily that portion to be expansively indicated.

Another object of the present invention is to provide a portable electronic timepiece with which one can learn whether the desired expansive position of his choice was right or not and, if he makes a mistake, the correction can be made quickly to actuate the selective expansive control in a short time. Moreover the position of the expanded portion can be selected with certainty without examining the portion other than the indication picture to confirm only if the user remembers the position of the expansive switch correctly.

The foregoing and other objects as well as the characteristic features of the invention will become more apparent and more readily understandable by the following description and the appended claims when read in conjunction with the accompanying drawing.

BRIEF DESCRIPTION OF THE DRAWINGS:

FIG. 1 is a face view of one embodiment of an electronic timepiece in accordance with the invention. Referring to this FIG. 1, a watch case 1 has a glass face through which can be seen an indicator 2 on which both a received image produced by a TV signal receiver and the time kept by a timekeeper in the watch case can be displayed. Projecting from the case 1 are a selecting switch button 3 whereby either a television display or a timekeeper display can be selected; a time correcting switch button 4; a switch button 5 for received frequency selection; a picture expanding switch button 6 for expanding a part of the television image; and a switch button 7 for expanding position selection. If the indicator 2 is provided with the aid of a non-spontaneous luminous indicator in order to provide a good display in the dark, a lamp or luminous diode is provided to act as such a light source and a button 8 is provided for energization of said source when it is required to display the time or the television image. The indicator 2 is composed of a first indicator 9 on which the TV image and the time are displayed and a second indicator 10 which displays the expansive position of the video picture, and both of which have an optical deflecting plate therebetween.

FIG. 2 is an enlarged schematic view of the first indicator 9 which constitutes a part of the image indicator 2 under the glass face of the electronic timepiece generally shown in FIG. 1. The first indicator 9 comprises mutually perpendicular sets of electrodes, namely a set of electrodes $X_1$-$X_{100}$ and $Y_1$-$Y_{100}$ with a layer of liquid crystal (not shown) between the two sets. The sets of electrodes are thin film electrodes made by any suitable known thin film technique. The height/width ratio of the picture area, which is the area covered by the two sets of electrodes is, in the present example, $\frac{3}{4}$, so that the spacing between adjacent X electrodes is $\frac{3}{4}$ of that between adjacent Y electrodes. Of course these particular numbers of electrodes, height/width ratio and electrode spacings (the same number-100-in each set; a height/width ratio of $\frac{3}{4}$ and a spacing ratio of $\frac{3}{4}$) are given by way of example only and other relative dimensions are possible. As will be understood, if a suitable electric field is applied between one of the X electrodes and one of the Y electrodes, the electron orientation of the liquid crystal material between those electrodes at their crossover point will be altered and display conditions will be set up at that point. Accordingly the matrix can be caused to display a letter or numeral or indeed any image by application of a suitable voltage between selected combinations of X electrodes and Y electrodes.

FIG. 3 is an enlarged schematic view of a second indicator 10 which constitutes a part of the indicator 2 under the glass face of the electronic timepiece generally shown in FIG. 1. The second indicator 10 comprises segments a-z having 26 identical electrodes and the electrodes which are common thereto (not shown), and which is composed of a spontaneous luminous diode for example. The indicative portion of said indicator 10 indicates if the voltage is applied to the Nesa electrodes which constitute the segments a-z.

FIG. 4a is a block diagram showing the circuitry provided inside the case 1 of FIG. 1 for the operation of the display device.

Referring to FIG. 4a, blocks 11 to 20 inclusive are circuits which together constitute receiver apparatus for handling a received television signal. These circuits are: a radio amplifier 11; a frequency convertor 12 for converting the frequency of the received television signal to an intermediate frequency by means of a local oscillator (not separately shown); an intermediate frequency amplifier 13 which amplifies the intermediate frequency; a video signal detector and amplifier 14 which detects and amplifies the output from the intermediate frequency amplifier 13; a synchronizing signal separator and amplifier 15 which separates and amplifies the vertical (field) and horizontal (line) synchronizing signals from the output from the detector and amplifier; an integrating circuit 16 which integrates the output from the synchronizing separator and amplifier 15; a differentiating circuit 17 which differentiates said output from the separator and amplifier 15; a wave shaper 18 which produces a vertical synchronizing pulse signal (hereinafter called simply a "vertical pulse") from the output from the integrating circuit 16; a waveshaper 19 (hereinafter called simply a "horizontal pulse") from the output from the differentiating circuit 17: and a comparator 20 which compares the video signal level output from the video detector and amplifier 14 with a predetermined reference level (from a source not separately shown) and which divides the video signal from 14 into signals corresponding roughly with white level signals and black level signals. The details of the circuitry in the blocks so far described are not shown since they are well known per se in television receiver practice.

Figure 1:
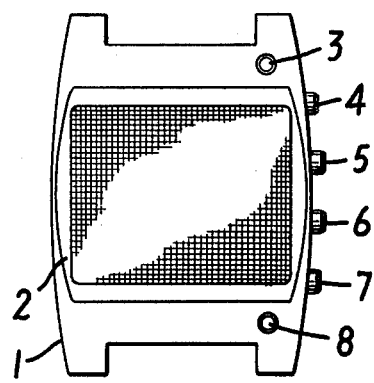
FIG. 1 is an external face view of a portable electronic timepiece according to the present invention.
Figure 2:
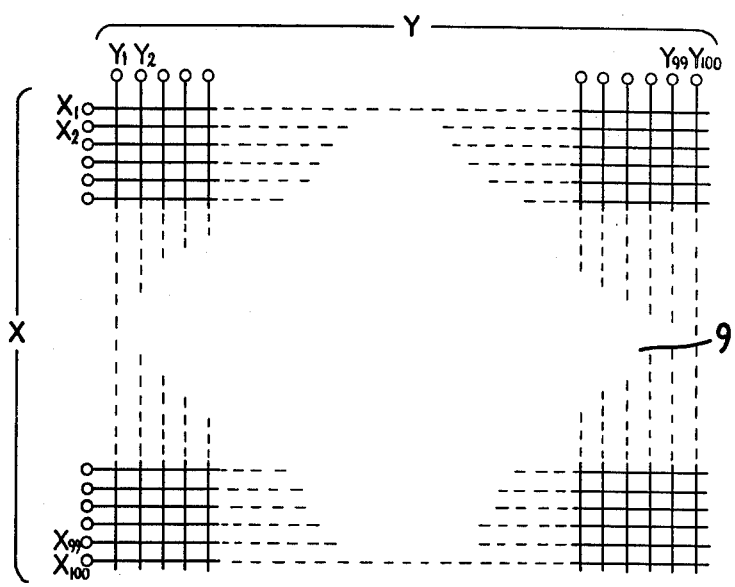
FIG. 2 is a schematic drawing of a first indicator comprising the indicator employed in the portable electronic timepiece shown in FIG. 1.
Figure 3:
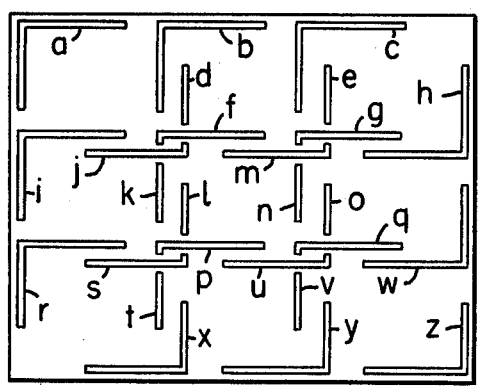
FIG. 3 is a schematic drawing of a second indicator comprising the indicator employed in the portable electronic timepiece shown in FIG. 1.

In order to facilitate understanding, suppose that the television transmission being received is in accordance with a standard now in use in Japan and that it is an interlaced 525 line picture with 60 fields and 30 frames per second. Accordingly the horizontal synchronizing signal from the wave shaper 19 will have a period of 63.5$\mu$s and the vertical synchronizing signal from the wave-shaper 18 will have a period of 16.66 ms. The video signal will be fed into the comparator 20 for the effective time of 53.3$\mu$s per scanning line if the horizontal fly-back time is 16% of the line period. Since the video signal is negatively modulated (with standard transmission assumed) the black level thereof, i.e. the level which produces black in a television picture, is put into the comparator 20 with a larger amplitude than the white level, i.e. the level which produces white in a television picture. The comparator 20 selects the white signal, comparing the video signal level with a predetermined reference voltage level which is slightly higher than the white level and gives a "0" output in response to black and a "1" output in response to white.

Blocks 21 to 44 inclusive are circuits which together constitute circuits to display the video picture obtained by the TV signal, (which is both wholly and partially indicated on the first indicator 9 selectively. A switch $S_{11}$ has three contacts 11a, 11b and 11c, the switching action of which is accomplished by the picture expanding switch button 6 shown in FIG. 1. The condition shown in the drawings is the ON-OFF condition of the contacts on the occasion that a part of the video signal is expansively displayed. The switch $S_{11}$ interlocks with switches $S_{12}$ and $S_{13}$ mentioned below.

Block 21 is a 263-stage ring counter the input terminal C of which receives the horizontal pulse produced by the wave shaper 19 and the reset terminal R of which receives the vertical pulse produced from the wave shaper 18. Each of the ring counter stage output terminals $a_1$-$a_{263}$ produces a logic "1" signal in turn corresponding with the application of the horizontal pulse and, at each vertical pulse, each of the stage output terminals $a_1$-$a_{263}$ changes to logic "0".

A switch $S_{21}$ has three contacts 21a, 21b and 21c the switching action of which is accomplished by turning the expanding position selection switch button 7 shown in FIG. 1 clockwise. The contacts 21a-21c are connected to the output terminals $a_1$, $a_{75}$, $a_{150}$ respectively of the ring counter 21. The outputs from the output terminals $a_1$, $a_{75}$, $a_{150}$ are fed to the input terminal B of a flip-flop circuit 22 via switch $S_{21}$. The output from the flip-flop circuit 22 is fed to the control terminal G of a gate circuit 23, as well as one side of the input terminal of an AND circuit 25. To the gate circuit 23 is fed the horizontal pulse from the wave shaper 19 via switch $S_{11}$. The gate circuit 23 opens only when the output from the flip-flop circuit 22 receives a "1" input and when it opens it passes the horizontal pulse to the input terminal c of a 100-stage ring counter 24. To the reset terminal R of the ring counter 24 is fed the vertical pulses produced from the wave shaper 18, and the ring counter 24 counts the horizontal pulses fed via gate circuit 23 up to 100 pulses, and then a "0" output is produced from the output terminal $a_{100}$ of the ring counter 24. The output signal of the output terminal $a_{100}$ is fed to the reset terminal and resets the ring counter. To the other input terminal of the AND circuit 25 is fed the horizontal pulse via switch $S_{11}$. Thus the output terminal of the output terminal 25 produces the horizontal pulse while the ring counter 24 is counting.

The blocks 21 to 25 so far described are the circuits to determine the vertical position of the expanded picture wherein the switch $S_{11}$ selects the vertical position thereof.

Block 26 is a 5-stage ring counter to display the whole of the video picture obtained by the video signal, the input terminal c of which receives the horizontal pulse via switch $S_{11}$ and the reset terminal R of which receives the vertical pulse. The output terminals $a_1$-$a_5$ of the ring counter 26 produce the logic "1" signal in turn and the vertical pulse resets the signal, whereupon the ring counter 26 repeats its cycle of operation.

Block 27 is a 2-stage ring counter to expansively display a part of the video picture, the input terminal C of which receives the horizontal pulse produced by the AND circuit 25 and the reset terminal R of which receives the vertical pulse. The output terminals $a_1$ and $a_2$ of the 2-stage ring counter 27 alternately produce logic "1" signal at each of the horizontal pulses and the vertical pulse resets the signal, whereupon the said ring counter 27 repeats its cycle of operation.

Block 28 is an oscillator which generates at least 100 pulses in accordance with the number of Y electrodes in the first indicator 9 during the effective scanning period of 53.5$\mu$s, and correspondingly generates a number of pulses in accordance with the magnification in case a part of the image is expansively displayed. The oscillating frequency of the oscillator 28 is in the present case about 1.87 MHz and 4.67 MHz, since the magnification is 6.25 times.

Outputs from the oscillator 28 having two different frequencies are selectively and respectively fed to a 300-stage ring counter 29, a 118-stage ring counter 30 and a gate circuit 33 by a switch $S_{12}$ which interlocks with the switch $S_{11}$; 1.87 MHz signal in case the whole of the video picture is indicated, while a 4,67MHz signal in case a part of the video picture is displayed.

The output terminals $a_1$–$a_{300}$ of the ring counter 29 provide a logic "1" signal when the above mentioned signal is put in. Outputs from the output terminals $a_1$, $a_{89}$ and $a_{176}$ are fed to the input terminals S of a flip-flop circuit 31 via switch $S_{31}$ having three contracts 31a, 31b and 31c which are switched by turning the expanding position selection switch button 7 shown in FIG. 1 counterclockwise. The output from the flip-flop circuit 31 is fed to the reset terminal R of the ring counter 30 via an inverter 32, the corresponding output of which is fed to one input terminal of the AND circuit 34, the other input terminal of which receives the output from the output terminal $a_1$ of the ring counter 27. The ring counter 30 counts the 4.67MHz signal up to 118 after the signal fed to the reset terminal is removed and produces a logic "1" signal from the output terminal $a_{118}$. The output signal is fed to the reset terminal R of the flip-flop circuit 31. To the reset terminal R of the ring counter 29 is fed the signal from the output terminal $s_2$ of the ring counter 27.

The blocks 29–32 so far described are the circuits to selectively determine the horizontal position of the expanding position, wherein the switch $S_{31}$ selects the horizontal position thereof.

The control terminal G of the gate circuit 33 receives the output from an OR circuit 35 to which the output from the output terminal $a_2$ of the ring counter 26 and the output from the AND circuit 34 are fed, and the output from the oscillator 28 is allowed to pass to the clock terminal CL of a 120-stage shift register 39 during the period in which a "1" appears at the control terminal G thereof.

The period during which a "1" appears at the output terminal $a_2$ of the ring counter 26 (in case of the whole image) is about 63.5μs, corresponding to the horizontal pulse period, while the period during which a "1" appears at the AND circuit 34 (in case of the expanded display) is about 25.4μs. In this period, the clock terminal CL of the shift register 39 receives 12 pulses controlled by the gate circuit 33. The video signal output from the comparator 20 is fed into the data input terminal D of the shift register 39 so that the said video signal is written into the shift register 39. This video signal written into the shift register 39 is cleared by the output signal from the stage output terminal $a_5$ of the ring counter 26, and the stage output terminal $a_2$ of the ring counter 27 which is fed to the reset terminal R of said register after being inverted by an inverter 37 via an OR circuit 36. The video signal is cleared synchronously with the rise time of the signal fed to the reset terminal R. In this way video signals contained in one scanning line out of five are written in turn when the ring counter 26 operates (in case of the whole image display), while about 1/2.5 of the video signals contained in one scanning line out of two are written in turn when the ring counter 27 operates (in case of expansive image display) in the shift register 39 respectively. The video signal written into 100 bits, less 20 bits due to the fly-back signal, is written out of 120-bits of the shift register 39 and is fed into the data input terminal D of a hundred bit memory 40 the output connectors of which are represented by an output terminal Q. The output from the output terminal $a_4$ of the 5-stage ring counter 26 and the output from the output terminal $a_2$ of the ring counter 27 are fed into the clock terminal CL of the memory 40 via an OR circuit 38 and accordingly when the clock pulse input changes from "0" to "1", the memory 40 memorizes the video signal fed into its data input terminal D from the shift register 39 and holds its content. The video signal memorized in the memory 40 is fed via a switching circuit 41 into a Y electrode driving circuit 42 which drives the Y electrodes of the first indicator 9. The driving circuit 42 generates a voltage determined in accordance with the outputs of the bits which compose the memory 40, and supplies corresponding respective voltages to the electrodes $Y_1$–$Y_{100}$.

Switches $S_{41}$, $S_{42}$ and $S_{43}$ are controlled by the indication selecting switch button 3 shown in FIG. 1. In FIG. 4 these switches are shown in the positions they occupy when a television signal is to be displayed.

Block 43 is an X-electrode driving circuit which generates a predetermined voltage to drive the X electrodes of the first indicator 9. The output from the driving circuit 43 is fed into a ring counter 44. The ring counter 44 to the clock terminal CL of which the signal from the OR circuit 38 is fed via switch $S_{43}$ as a clock pulse is comprised of first and second 50 bits counter portions and performs the following operations. First the first counter portion counts the clock pulses fed into clock terminal CL, and when a reset signal is fed into its reset terminal R the said first counter portion is reset. Next the second counter portion counts the clock pulses and when a reset signal again appears, the second counter portion is reset and the first counter portion counts the clock pulses. The outputs of the first counter portion of the ring counter 44 are respectively fed to the odd numbered X electrodes $X_1$, $X_3$, $X_5$. . . $X_{99}$ of the first indicator 9 and the outputs of the second counter portion are similarly respectively fed to the even numbered electrodes $X_2$, $X_4$, $X_6$. . . $X_{100}$ of said indicator. The voltage fed out from the ring counter 44 corresponds with the voltage generated from the driving circuit 43. When the TV signal is displayed, the vertical pulse is fed to the reset terminal R of the ring counter 44 via switch $S_{42}$.

As will be appreciated, the circuitry mentioned so far are the circuits to display the video picture wholly and partially. A description will now be given of the circuits to display the position of the expanded portion on the second indicator 10.

A switch $S_{22}$ having three contacts 22a, 22b and 22c interlocks with the switch $S_{21}$ one end of which is connected to the terminal to which the voltage VDD is applied. The three contacts 22a–22c are respectively connected to input terminals of the code transducer 45.

A switch $S_{32}$ having three contacts 32a, 32b and 32c interlocks with the switch $S_{31}$ one end of which is connected to the terminal to which the voltage VDD is applied. The three contacts 32a–32c are respectively connected to input terminals of the code transducer 45. The code transducer 45 converts the input signal from the switches $S_{22}$ and $S_{32}$ into a code suitable for driving the second indicator 10, which operates only when switch $S_{13}$, interlocking with switches $S_{11}$ and $S_{12}$ and having three contacts 13a, 13b and 13c, is closed. Both contacts 13a and 13c of switch $S_{13}$ are grounded and contact 11b of switch $S_{11}$ is connected to the terminal to which the voltage VDD is applied. Output from the code transducer 45 is fed to a driver 46 the output of which correspond to the segment showing one expansive position of the second indicator 100. The driver 46 operates in accordance with the input fed from the code converter 45 and drives the second indicator 10.

Blocks 47–53 comprising the circuitry for displaying time indicating signals from the time keeping apparatus will now be described.

Block 47 is a piezo-electric (quartz) oscillator or other accurate time standard oscillator of the timepiece. The output frequency thereof is frequency divided down to the time counting reference pulse of 1Hz by means of a frequency divider 48 which may, for example, (depending on the frequency of oscillator 47) comprise 15 divide-by-two divider stages. The 1Hz reference pulses from the divider 48 are counted by a counter system 49 including a divide-by-60 counter for producing second signals, another divide-by-60 counter for producing minute signals and a divide-by-12 counter or a divide-by-24 counter for counting the hour signals. The outputs from the counter system 49 comprise hour, minute, and second signals and these are fed to a code transducer 50 capable of producing coded signals suitable for the display of time digitally on the first indicator 9.

Block 51 is a variable ratio divider which divides the ouput signal from the time standard oscillator 47 into a signal of 3KHz. The output from this divider 51 is fed to the clock terminal of the ring counter 44 through switch $S_{43}$ and also to the clock terminal CL of a series signal transducer 52 which converts the output of the code transducer 50 into a series of signals synchronized with the clock input at the clock terminal CL of said transducer 52. The serial transducer 52 converts the output from the code transducer 50 into a series of signals synchronizing with the signals fed to the clock terminal CL. The serial transducer 52 has 100 outputs corresponding with the Y electrodes of the first indicator 9, and the series of signals from serial transducer 52 are fed into the Y electrode driving circuit 42 via switching circuit 41 when switch $S_{41}$ (one end of which is connected with the terminal to which the voltage VDD is applied) is switched in reverse condition to that shown in the drawings.

Block 53 is a counter having a terminal $Q_{50}$ at which an output pulse appears whenever the output pulses from the variable divider 51 reach a count of 50, and a terminal $Q_{100}$ at which an output pulse appears whenever the output pulses from the variable divider 51 reach a count of 100. Output pulses from terminal $Q_{50}$ of counter 53 are fed to the reset terminal R of the ring counter 44 through switch $S_{42}$ and the output from terminal $Q_{100}$ is fed to a control terminal C of the transducer 52. The transducer 52 is arranged to convert the output from the code transducer 50 into a series of signals under the control of the input control pulses fed to transducer 52 from counter 53 so that synchronization of the driving of the electrodes $X_1$, $X_3$, ... $X_{99}$, $X_2$, $X_4$, ... $X_{100}$ with the corresponding signals is obtained.

The manner in which the apparatus operates when in use will now be described.

Suppose first that the switches $S_{11}$, $S_{12}$, $S_{13}$ are respectively closed to each of the contacts 11a, 12a, 13a and the switches $S_{41}$–$S_{43}$ are in the positions shown, i.e. television signals are to be wholly displayed on the first indicator 9.

Figure 5:
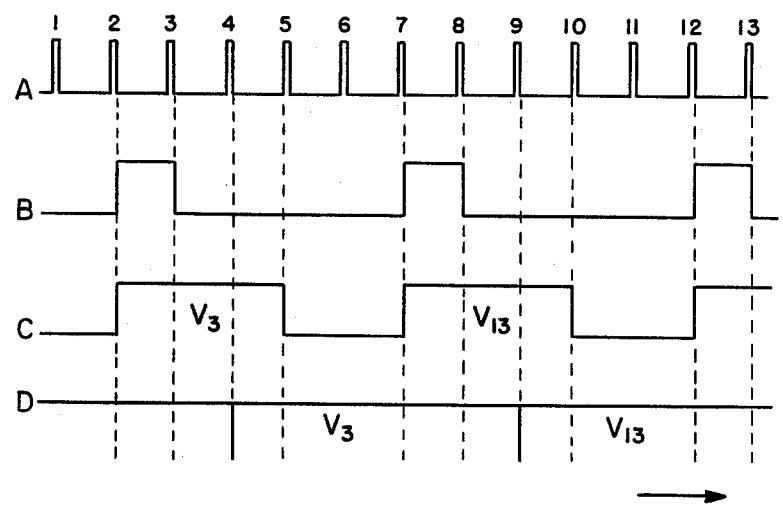
FIG. 5 is a time-chart illustrating the operation of the circuits shown in FIGS. 4a and 4b.

Following the assumptions already made, the period of the vertical synchronizing signal which is included in the composite video signal of the assumed interlaced standard television signal and which performs field (vertical), fly-back of 16.66 ms, in which time one field is scanned, two interlaced fields making up a frame. The horizontal synchronizing signal is regularly repeated at a period of 63.5us, 262.5 such signals being transmitted during one frame. The output of the interlacing circuit 16 corresponds with a vertical synchronizing signal and an equalizing pulse. The wave-shaper 18 is designed to equalize the width of the vertical pulses which it produces in the vertical fly-back periods. This vertical fly-back period is, as is well know, of such length that 16 horizontal synchronizing signals occur in its duration. 263 horizontal pulses are fed into the 5-stage counter 26 during a first field scanning period, and 262 horizontal pulses are fed into it during the next field scanning period. Actually, however, the numbers of horizontal pulses counted by the ring counter 26 are 247 during said first field scanning and 246 during said second field scanning. This is because of the feeding of the above-mentioned vertical pulse to the reset terminal R of said counter 26. FIG. 5 shows graphically to a common abscissa time scale what happens after a vertical pulse ceases and reset is effected. As shown in line A of FIG. 5, when a horizontal pulse is fed into the ring counter 26, a "1" signal of limited duration appears at each of the stage output terminals $a_1$ to $a_5$. Line B shows the second, seventh and twelfth . . . and so on "1" signal pulses which appear at terminal $a_2$ horizontal pulses, i.e. every fifth line and which last each for an effective scanning line duration. When the output at terminal $a_2$ becomes "1", the gate circuit 20 opens and clock pulses of 1.87MHz from the oscillator 28 are fed into the shift register 39. Since the opening period of the gate circuit 33 is 63.5us, 118-clock pulses are put into shift register 39 into which the video signal from the comparator 20 is written. Since the effective scanning period of the horizontal scanning line is 53.5μs, the effective constituents of the video signal written into the shift register 39 are from the 19th and 118th clock pulse. The horizontal scanning is interlaced line scanning and the second horizontal pulse after the generation of the vertical pulse corresponds practically to the third scanning line in the frame. Therefore the video signal contained in the third scanning line is memorized in the shift register 39. When the fourth horizontal pulse occurs and the output terminal $a_4$ of the ring counter 26 changes from "0" to "1", the video content written into the shift register 39 between the 19th and 118th clock pulse is memorized in the memory 40. Also because the output from the terminal $a_4$ is fed into the ring counter 44, the predetermined voltage generated from the driving circuit 43 is applied to the electrode $X_1$ of the first indicator 9. Because the contents of the memory 40 are feed into the driving circuit 42 via the switch circuit 41, the driving voltages which correspond with the divided level outputs from the comparator 20 during the video signal occurring in the third scanning line are respectively applied to each of the electrodes $Y_1$ to $Y_{100}$ in the first indicator 9. Accordingly, the indications given at crossing points of the electrodes $Y_1$, $Y_3$, . . . $Y_{99}$ or $Y_2$, $Y_4$, . . . $Y_{100}$ with the electrode $X_1$ are in accordance with the video signal put out from the comparator 20.

When the fifth horizontal pulse is fed into the ring counter 26 and the terminal $a_5$ becomes logic "1", this signal is fed to the reset terminal R of the shift register 39 via the OR circuit 36 and the inverter 37 and the said shift register 39 is reset.

Meanwhile, however, the video signal contained in the third scanning line is maintained in the memory 40. Line C in FIG. 5 shows the operating condition of the shift register 22, while line D of that FIG. shows the operating condition of the memory 40, $V_3$ and $V_{13}$ being respectively the video signals of the 3rd and 13th scanning lines.

During the first field scanning period during which 247 horizontal pulses effectively occur, 49 output pulses from the terminal $a_4$ of the ring counter 26 and the odd numbered X electrodes $X_1$, $X_3$... $X_{97}$ of the first indicator 9 are driven in turn during the first field scanning period. When the electrode $X_{97}$ is being driven, the video signal memorized in the memory 40 corresponddds with the 483th scanning line. The ring counters 26 and 44 are reset by the vertical pulse generated between the finish of the first field scanning and the beginning of the second field scanning, and the 50-stage second counter of the ring counter 44 comes into action. From the beginning of the second field scanning, the video signal memorized in the memory 40 is handled, in the same way as above described, at every fifth line pulse and the even numbered X electrodes $X_2$, $X_4$... $X_{98}$ in the first indicator 9 are driven in accordance with what is written in the ring counter 44. Each scanning frame is terminated by termination of the second field scanning. The whole video signals occuring during the frame period are, as will be seen, reproduced wholly and visually as a television picture by the first indicator 9.

Suppose next that the switches $S_{11}$, $S_{12}$, $S_{13}$ are respectively closed to each of the contacts 11c, 12c, 13c and the switches $S_{41}$–$S_{43}$ are in the positions shown i.e. a part of the video signals are expansively displayed, the performance under these conditions will be described, with the switches $S_{21}$, $S_{31}$ closed in the position shown.

The horizontal pulse obtained via the switch $S_{11}$ is fed to the ring counter 21 which selects the vertical position of the expanded picture, as the clock pulse. The ouput terminal $a_{75}$ of the ring counter 21 produces a logic "1" output when the 75th horizontal pulse after the vertical pulse is fed out and the reset is resolved. The flip-flop circuit is actuated by this signal and produces a logic "1"output from the output terminal Q. While the output signal is in logic "1", the horizontal pulse is fed to the clock terminal C of the 2-stage ring counter 27 via the AND circuit 25, while the horizontal pulse is fed to the input terminal C of the ring counter 24 via the gate circuit 23. The ring counter 24 produces a logic "1" output from the output terminal $a_{100}$ after counting 100 horizontal pulses and the signal allows the flip-flop circuit 22 to be reset. Thereafter the horizontal pulses from the AND circuit 25 and the gate circuit 23 are fed out. Accordingly the horizontal pulses fed to the input terminal C of the ring counter 27 are from the 76th to the 175th. Similarly 100 horizontal pulses are fed during the second field scanning period. The operation of the ring counter 27 is basically similar to that of the ring counter 26, and the output terminals $a_1$, $a_2$ produce a logic "1" signal in turn whenever 2 horizontal pulses are fed. The gate circuit 33 opens when a signal is produced from the output terminal $a_1$ and the signal applied to the other input terminal of the AND circuit 34 is logic "1", and a 4.67MHz pulse generated from the oscillator 28 is fed to the clock terminal CL of the shift register 39. Furthermore, the output terminal $a_2$ turns from logic "0" to logic "1" when the horizontal pulse is fed to the input terminal C of the ring counter 27. When the output terminal turns from logic "0" to logic "1", the memory 40 receives and maintains the content of the shift register 39. On the other hand, when the output terminal turns from logic "1" to logic "0", the content of the shift register 39 is cleared.

Figure 6:
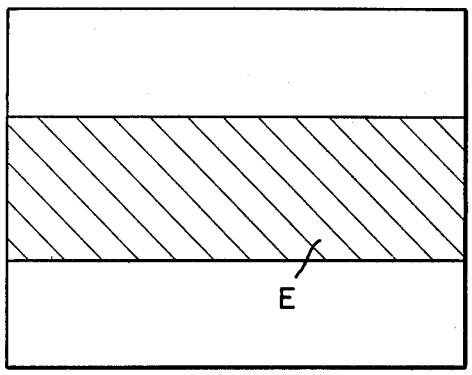
FIG. 6 is a drawing showing the expansive position in a vertical direction.

Thus the upper end of the expansive position of the video picture is determined by the ring counter 21, while the lower end thereof is determined by the ring counter 24. The shaded area E in FIG. 6 shows the expansive position in the vertical direction in case the signal applied to the other input terminal of the AND circuit 34 (the output signal from the flip-flop circuit 31) is logic "1".

The input terminal C of the ring counter 29 receives the 4.67MHz pulses produced from the oscillator 28, since the magnification thereof is 6.25 times, and 118 pulses are fed to the shift register 39 in 25.4$\mu$s (about 1/2.5 of the scanning period of a scanning line).

The output terminal $a_{89}$ of the ring counter 29 which counts the above mentioned clock pulses produces a logic "1" output when the output signal from the output terminal $a_2$ of the ring counter 27 become logic "0" and counts up to 89 pulses. Thereupon the signal actuates the flip-flop 31 and the ring counter 30 starts counting from the 90th pulse. Meanwhile the signal fed to the other input terminal of the AND circuit 34 (i.e. the output signal of the flip-flop circuit 31) is logic "1". The ring counter 30 starts counting from the 90th pulse and produces a logic "1" output from the output terminal $a_{118}$ when 118 pulses are counted. The flip-flop circuit 31 is reset by the signal and the signal fed to the other input terminal of the AND circuit 34 (i.e. the output signal of the flip-flop circuit 31) turns to logic "0". Accordingly the output of the AND circuit 34 turns to logic "1" when the said flip-flop circuit 31 is reset although the signal is produced from the output terminal $a_1$ of the ring counter 27.

Thus the left end of the expanded video picture is determined by the ring counter 29, while the right end thereof is determined by the ring counter 30. The shaped area F in FIG. 7 shows the expansive position in a horizontal direction when the output signal of the output terminal $a_1$ of the ring counter 27 is logic "1".

The gate circuit 33 is opened and closed under the control of the signal from the output terminal $a_1$ of the ring counter 27 and the signal from the flip-flop circuit 31, and passes 4.67MHz pulses produced from the oscillator 28. The performances of the blocks 39–44 is the same as that for the whole indication of said video picture.

Figure 7:
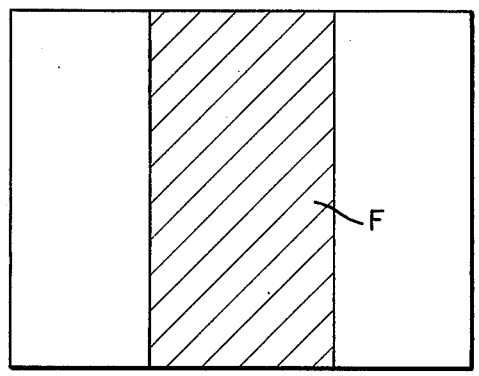
FIG. 7 is a drawing showing the expansive position in a horizontal direction.

FIG. 6 and FIG. 7 respectively show examples for selectively determining the expansive position in the horizontal and vertical direction when the switches $S_{21}$ and $S_{31}$ are closed in the condition shown by way of example. Actually, however, as area G in FIG. 8 shows, the crossed hatched portion of the horizontal and vertical portions is selectively determined to be expansively displayed in the first indicator 9.

Figure 8:
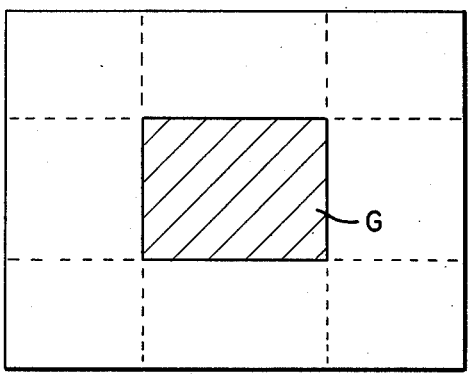
FIG. 8 is a drawing showing the crossed portion of the expansive positions shown in FIG. 6 and FIG. 7.
Figure 9:
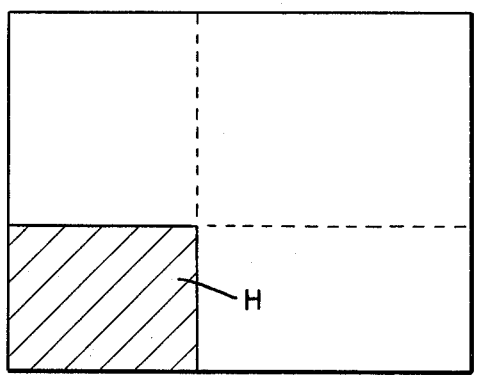
FIG. 9 is a drawing showing the selected expansive position.

FIG. 8 shows the expansively displayed portion when the switch $S_{21}$ is closed to the contact 21b and the Switch $S_{31}$ is closed to the contact 31b, respectively. When the switch $S_{31}$ is closed to the contact 31a for instance area H in FIG. 9 is expansively displayed. Thus the desired portion can be expansively displayed by suitably selecting the closing positions of the switches $S_{21}$ and $S_{31}$.

Next the performance of the blocks to indicatively drive the second indicator 10 to indicate the expansive position will be described.

Figure 10:
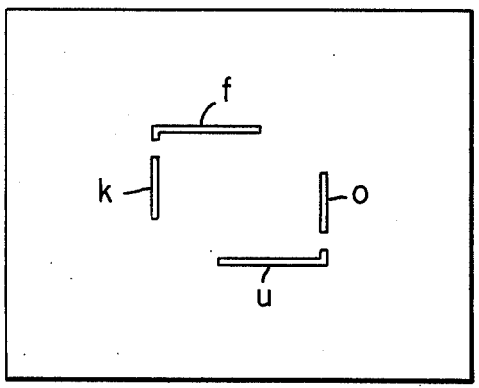
FIG. 10 is a drawing showing the expansive position indication indicated on the first indicator.
Figure 11:
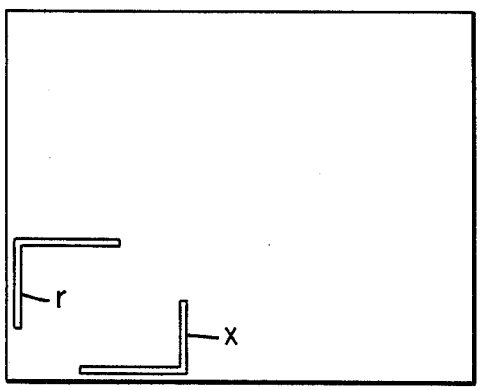
FIG. 11 is a drawing showing the expansive position indication indicated on the second indicator.

Block 45 is a code transducer which operates only when the switch $S_{13}$ is closed to the contact 13b. According to the drawing, the switches $S_{11}$ and $S_{12}$, which interlock with the switch $S_{13}$ are respectively closed to the contacts 11b and 12b. The first indicator therefore indicates the whole video picture. In case the switch $S_{22}$ which interlocks with the switch $S_{21}$ is closed to the contact 22b, and the switch $S_{31}$ is closed to the contact 32b, the code transducer 45 produces an output corresponding to segments f, k, a, u of the second indicator 10 and the signal is supplied to the second indicator 10 the power supply of which is amplified suitably by the driver 46. FIG. 10 shows the indicating condition of the expansive position in case the switch $S_{22}$ is closed to the contact 22b and the switch $S_{32}$ is closed to the contact 32 respectively, which corresponds to the expansive position designated as G in FIG. 8. Similarly it is to be understood that the expansive position corresponding to the expansive position H in FIG. 9 is indicated as shown in FIG. 11 in case the switch $S_{22}$ is closed to the contact 22c and the switch $S_{32}$ is closed to the contact 32b.

Thus, it is possible to indicate the expansive position accurately corresponding to the expansive indicating portion since the expansive position is indicated by the switches which interlock with the switches which select the expansive indicating position.

It is to be understood that the magnification can suitably be changed by design modification of the content of the counters 24, 27 and 30 although the magnification according to the present invention is 6.25 times. In this case, the modification in the oscillating output frequency of the oscillator 28 or the circuits for expansive position indication attended with the design modification is required.

On the other hand, although the ring counter 44 actuates the first counter at odd numbered field scanning and the second counter at even numbered field scanning, the reversal condition is supposed according to the starting condition, so that it is preferable to provide a switch to receive the required reset pulses at the reset terminal R of the ring counter 44 in order to modify the reversal condition.

The operation when the switches $S_{41}$, $S_{42}$ and $S_{43}$ are put into the opposite positions from those shown, i.e. when time from the time-keeper is to be displayed by the first indicator 9, will now be described.

The switch $S_{41}$ is opened and this causes the switch circuit 41 to handle the serial signal output from the transducer 52 instead of the output from the memory 40; the output from the output terminal $Q_{50}$ of the counter 53 is fed to the reset terminal of the ring counter 44 through the switch $S_{42}$, and the output pulses from the variable divider 51 are fed into the clock terminal CL of the ring counter 44 through the switch $S_{43}$. As described above, the output of the counter 49 which counts the normal 1Hz output from the divider 48 and the count content thereof, as a measure of the time, is transformed by the code transducer 50 into a coded signal adapted for use by the first indicator 9. The contents of the code transducer 50 are extracted by the pulses from the variable divider 51 and then converter into a series train of signals by the serial transducer 52. These signals are fed in turn to the driving circuit 42 by way of the switch circuit 41. However, since the same sampling pulse — the pulse from the divider 51 — is fed to the serial transducer 52, the X electrodes of the first indicator 9 are driven in turn in synchronized relation with the series of signals from 52. The odd numbered X electrodes $X_1, X_3 \ldots X_{99}$ are first driven in turn, and then due to the application of the reset signal from terminal $Q_{50}$ of the counter 53 through the switch $S_{42}$ to the reset terminal R of the counter 44, the even numbered X electrodes $X_2, X_4 \ldots X_{100}$ are driven in turn. The code transducer 50 and the serial transducer 52 provide the driving circuit 42 with a series of signals required for the driving of the electrodes $X_1$-$X_{100}$. A pulse corresponding with the second pulse from the output terminal $Q_{50}$ of the counter 53, occurs at the output terminal $Q_{100}$ of said counter and this ensures that the series of signals from the transducer 52 and the drive timing of the electrodes $X_1$-$X_{100}$ are correctly synchronized. In this way a time corresponding with the count content of the counter system 49 is displayed by the first indicator 9.

Figure 4A:
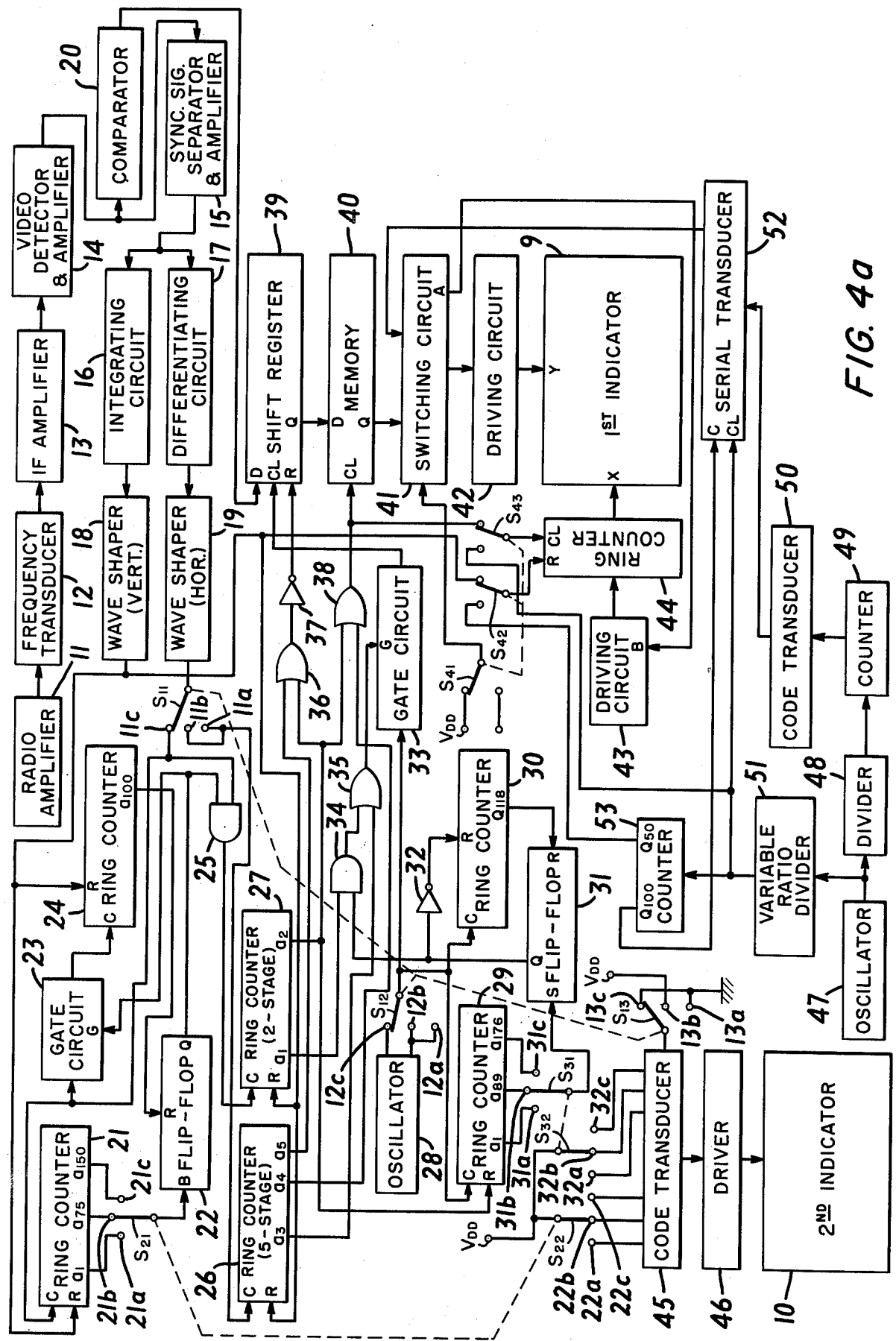
FIG. 4a is a circuit diagram embodying circuitry of a portable electronic timepiece according to the present invention.
Figure 4B:
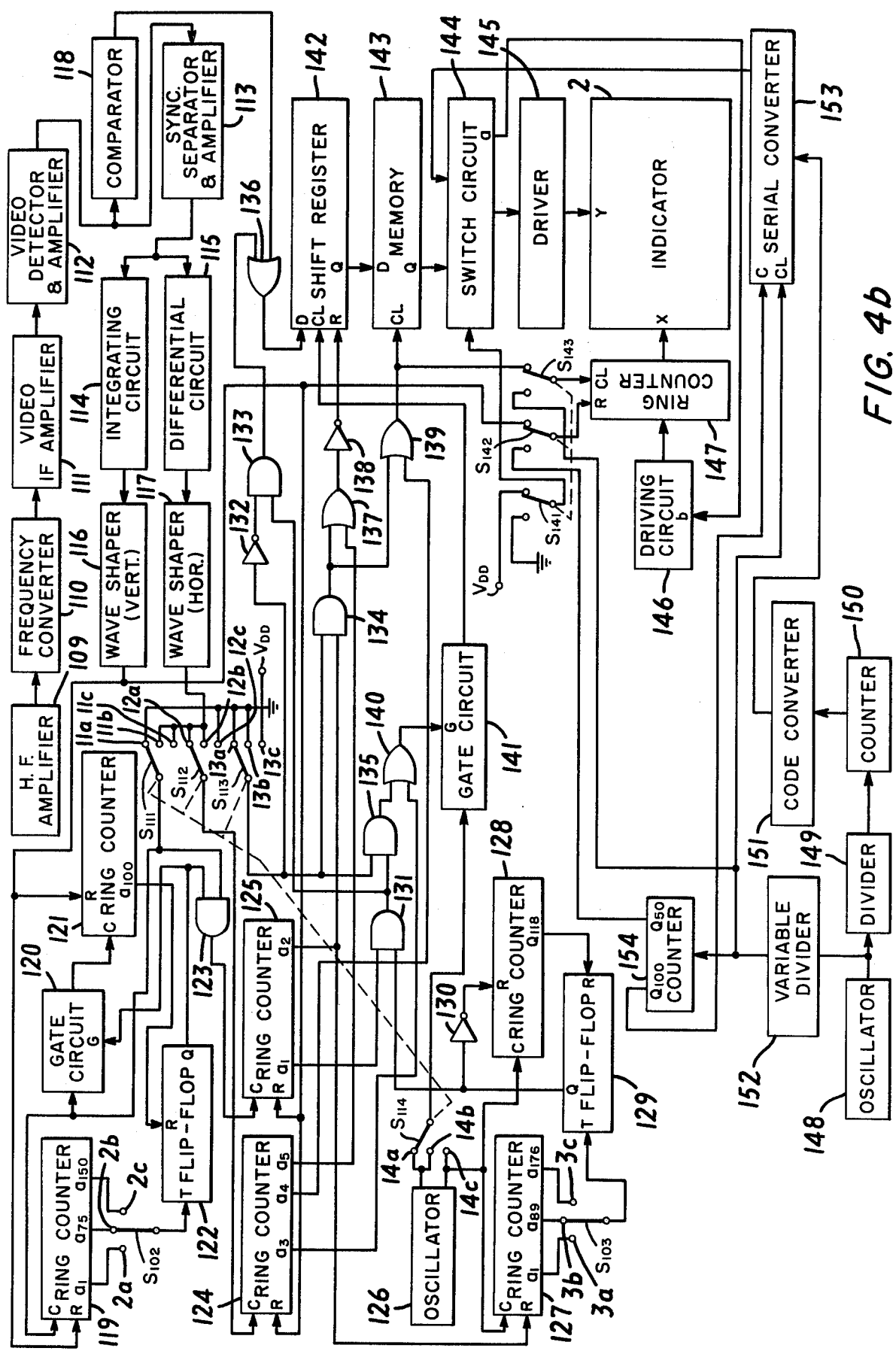
FIG. 4b is another circuit diagram embodying circuitry of a portable electronic timepiece according to another embodiment of the present invention.

Another embodiment of circuitry for the portable electronic timepiece according to the present invention is shown in FIG. 4b and will now be described.

In FIG. 4b, blocks 109-118 are circuits which constitute the receiving portions to receive the TV video signal and comprise: a high frequency amplifier 109; a frequency converter 110 which obtains the video intermediate frequency signal by mixing the signal from the high frequency amplifier 109 with the frequency signal produced by a local oscillating circuit separately; a video intermediate frequency amplifier 111 which amplifies said video intermediate frequency signal; a video detector and amplifier 112 which detects and amplifies the output of the video intermediate frequency amplifier 111; a synchronizing separator and amplifier 113 which amplifies the vertical synchronizing signal and the horizontal synchronizing signal separated from the output of the video detector and amplifier 112, an integrating circuit 114 which integrates the output signal from the synchronizing separator and amplifier 113, a differential circuit 115 which differentiates the output signal from the synchronizing separator and amplifier 113, a wave shaper 116 which modifies the wave-shape of the output of the integrating circuit 114 to produces a vertical synchronizing signal pulse (hereinafter described as the vertical pulse), a wave shaper 117 which shapes the output of the differential circuit 115 to produce a horizontal synchronizing signal pulse (hereafter described as the horizontal pulse), and a comparator 118 which compares the video signal level output from the video detector and amplifier 112 with a predetermined standard level and which divides the video signal roughly into white level and black level.

The performance of the receivers of this kind may easily be understood from the performance of known TV receivers, but illustrations will follow so that this invention may be undertood more readily.

To give an example, the TV transmitting signal has 525 scanning lines and 30Hz frame frequency which is the standard TV transmitting signal in Japan. The vertical pulse generated by the wave shaper 116 has a period of 16.66mms, while the horizontal pulse generated by the wave-shaper 117 has a period of 63.5$\mu$s. The video signal is fed to the comparator 118 for the effective time of 53.3$\mu$s per scanning line if the horizontal flyback time is 16% of the line period.

As the video signal is negatively modulated, the amplitude of the black level which looks black is higher than the white level which looks white on the TV picture. The comparator 118 selects the signal such as the time indication or the like which looks white on the TV picture out of the other signals for example, and makes said signal on the indicator 2 appear so as to discriminate this signal from the other signals. Therefore the level of the video signal is compared with a voltage slightly higher than the white level and the comparator 118 puts out a signal of logic "0" for the black level and of logic "1" for the white level.

Blocks 119–147 comprise the circuits for selectively indicating the whole and the parts of the image received by TV signal, on the indicator 2.

A switch $S_{111}$ is provided with contact points 11a, 11b, 11c which are ON-OFF operated by the picture enlarging switch button 6. The switch $S_{111}$ interlocks with switches $S_{112}$, $S_{113}$, $S_{114}$ described below.

The horizontal pulse put out from the wave-shaper 117 is put in the input terminal C of a 263-stage ring counter 119 by way of the switch $S_{111}$, while the vertical pulse put out from the wave shaper 116 is put in the reset terminal R. The ring counter 119 puts out a signal of logic "1" from the output terminals $a_1$-$a_{263}$ in turn whenever a horizontal pulse in put in, and is reset by a vertical pulse, and said operations are repeated by horizontal pulses after the whole output becomes logic "0" and a vertical pulse is not put in.

The output terminals $a_1$, $a_{75}$, $a_{150}$ of the ring counter 119 are respectively connected with three contact points 2a, 2b, 2c of the switch $S_{102}$ which are ON-OFF operated by controlling the enlarging portion selecting switch button 7 shown in FIG. 1 clockwise and the signal from the output terminal selected by the switch $S_{102}$ is fed to an input terminal T of a flip-flop circuit 122 (hereafter referred to as FF). The output of the FF 122 is fed to a control terminal G of a gate circuit 120, as well as to one side of an input terminal of an AND circuit 123. The gate circuit 120 passes an input horizontal pulse from the wave-shaper 117 through the switch $S_{111}$ to a 100-stage ring counter 121 while the output of the FF 122 is in logic "1". The vertical pulse is put in the reset terminal R of the ring counter 121. When the horizontal pulse put in by way of the gate circuit 120 comes to 100, a signal of logic "1" is put out from the output terminal $a_{100}$ of the ring counter 121, and the signal thereof is fed to the reset terminal R of the FF 122.

On the other hand, a horizontal pulse is fed in the other input terminal of the AND circuit 123 by way of the switch $S_{111}$. Accordingly, supposing that the switch $S_{102}$ is connected to the contact point 2b, the 76th horiziontal pulse is put out for the first time from the AND circuit 123, when the vertical pulse is not applied to the reset terminal R of the ring counter, until the 175th horizontal pulse is put out.

The above-mentioned components 119–123 are the circuits which decide the vertical portion of the enlarged picture which constitutes the part of the enlarged image and the enlarged portion indicating circuits, wherein the switch $S_{122}$ is a circuit to select the vertical position of the enlarged portion.

A horizontal pulse from the wave shaper 117 is put in the input terminal C of a 5-stage ring counter 124 by way of a switch $S_{112}$ provided with three contact points 12a, 12b and 12c, while a vertical pulse from the wave shaper 116 is put in the reset terminal R. The 5-stage ring counter puts out a signal of logic "1" from the output terminals $a1$-$a5$ in turn whenever the horizontal pulse is put in and is reset by the vertical pulse, and repeats the above mentioned operation.

A 2-stage ring counter 125 constitutes the enlarging indication and the enlarging portion indicating circuit, wherein a horizontal pulse put out from the AND circuit 123 is put in the input terminal C while the vertical pulse is put in the reset terminal R. The 2-stage ring counter putsout a signal of logic "1" from theoutput terminals$a_1$, $a_2$ alternately whenever a horizontal pulse is put in, and is reset by the vertical pulse and repeats the above mentioned operation.

An oscillating circuit 126 generates at least a hundred pulses in accordance with the number of electrodes of the row electrode Y of the indicator 2, as well as generating a number of pulses in accordance with rate of enlargement in case a partial image is enlarged and displayed. According to the present embodiment, the oscillating frequency of the oscillating circuit 126, when the rate of enlargement of the picture is 6.25 times, is 1.87 MHz in case of a normal picture and is 4.67 MHz in case of an enlarged picture. The output signals of the two frequencies put out from the oscillating circuit 126 are 1.87 MHz in case of a normal picture and enlarging portion indication, while 4.67 MHz in the case of an enlarging display of the video picture. The 1.87 MHz signals are fed to the gate circuit 141. On the other hand, the signal of 4.67 MHz is directly fed to a 300-stage ring counter 127 and a 118-stage ring counter 128.

The ring counter 127 puts out a signal of logic "1" from the output terminals $a_1$-$a_{300}$ in turn whenever the signal of 4.67 MHz from the oscillator 126 is put in. The output from the output terminals $a_1$, $a_{89}$, $a_{176}$ is fed to the input terminal T of the FF 129 by way of the switch $S_{103}$ provided with three contact points 3a, 3b, 3c which are ON-OFF operated by operating the enlarging portion selecting switch button 7 shown in FIG. 1 counterclockwise. The output from the FF 129 is put in the reset terminal R of the ring counter 128 by way of an inverter 130. The output is also put in one input terminal of the two-input AND circuit 131 while the output from the output terminal $a_1$ of the ring counter 125 is put in the other input terminal. The ring counter 128 starts counting the signal of 4.67 MHz from the time that the signal put in the reset terminal R becomes logic "1" until a count of 118, wherefrom a signal of logic "1" is put out from the output terminal $a_{118}$ and fed to the reset terminal R of FF 129.

The output from the output terminal $a_2$ of the ring counter 125 is fed to the reset terminal R of the ring counter 127.

The circuits designated by the reference numerals 125–130 which are mentioned above are the circuits to which decide the horizontal portion of the enlarged picture which constitutes part of the enlarged image and the enlarged portion indicating circuit, wherein the switch $S_{103}$ is to select the horizontal portion thereof.

A switch $S_{113}$ is provided with three contact points 13a, 13b, and 13c, wherein the contact points 13a, 13b are grounded, while a high potential voltage such as the power source voltage VDD or the like is applied to the contact point 13c. The signal obtained by the switch $S_{113}$ is put in one input terminal of the AND circuit 133 by way of the inverter 132, as well as being put in one of the input terminals of the AND circuit 134 and the AND circuit 135 directly. The output of the AND circuit 131 is put in the other input terminal of the AND circuit 133, and the output thereof is put in one input terminal of an OR circuit 136, while the video signal put out from the comparator 118 is put in the other input terminal of the OR circuit 136.

The signal from the output terminal $a_2$ of the ring counter 125 is put in the other input terminal of the AND circuit 134, and the output thereof is put in one input terminal of the OR circuit 137, while the output from the output terminal $a_5$ of the ring counter 124 is fed to the other input terminal. The output of the OR circuit 137 is fed to the reset terminal R of a 120-stage shift register 142 by way of an inverter 138. The output from the output terminal $a_4$ of the ring counter 124 and the output from the AND circuit 134 are put in the OR circuit 139, the output of signal to which is fed as a clock of a hundred-bit memory 143. On the other hand, the output of the OR circuit 140, which receives the output from the output terminal $a_3$ of the ring counter 124 and the output from the AND circuit 135, is fed to the control terminal G of the gate circuit 141, and the gate circuit 141 passes the signal from the oscillating circuit 126 to the clock terminal C of the 120-stage shift register 142 while the control terminal G is logic "1".

The components identified by the above-mentioned reference numerals 132–141 comprise the circuits which are driven in all cases of normal image display, enlarging image display and enlarging a portion of an image display.

The output from the OR circuit 136 is fed to the input terminal D of the shift register 142 and it is sampled by clock pulses to step the shift register 142 in turn. The signals set in the shift register are cleared by the reset signal fed to the reset terminal R.

Of the signals set in the 120 registers of the shift register 142, the video signal set in 100-reigsters except 20 registers in which the fly-back signal is set, are put in the data input terminal Q of a 100=bits memory 143 from the output terminal Q. The content of the shift register 142 is memorized in the memory 143 and the output signal thereof is held constantly according to the timing of the clock pulse put in the memory 143 by way of the OR circuit 139 changing from logic "0" to logic "1". The signal the output of which is constantly held is put in the row driving circuit 145 which drives the row electrode Y of the indicator 2 by way of the switch circuit 144, and the signal transduced into predetermined voltage is fed to the electrodes $Y_1$–$Y_{100}$ of the Y-row electrode.

Numerals $S_{141}$–$S_{143}$ represents the ON-OFF switches controlled by the indication selecting switch button 3 shown in FIG. 1, and the positions of the switches $S_{141}$–$S_{143}$ shown in FIG. 4b represent the ON-OFF state indicating the TV signal.

A longitudinal driving circuit 146 generates a predetermined voltage to drive the longitudinal electrode X of the indicator 2. The voltage generated is put in a ring counter 147. The composition of the ring counter 147, to which the signal put out from the OR circuit 139 is put in the clock terminal CL as a clock pulse by way of the switch $S_{143}$, consists of a two-part counter comprising a first 50-stage counter and second 50-stage counter. When the first counter counts the clock pulses put in the clock terminal CL and the reset signal is put in the reset terminal R, the content of the first counter is reset, subsequently the second counter counts the above mentioned clock pulses and when the reset signal is put in the reset terminal R again, the content of the second counter is reset, correspondly the first counter counts the clock pulses.

The output from the first counter of the ring counter 147 is put in the respective electrodes in odd numbers $X_1$, $X_3$, $X_5$, ... $X_{99}$ of longitudinal electrode X of the indicator 2, while the output from the second counter is put in the respective electrodes in even numbers $X_2$, $X_4$, $X_6$, ... $X_{100}$.

The voltage put out from the ring counter 147 corresponds to the voltage generated from the longitudinal driving circuit 146. When the TV signal is displayed, the vertical pulse is put in the reset terminal R of the ring counter 147 by way of the switch 142.

The above mentioned are the circuits to display the images obtained by a TV signal.

Next, the circuits to display the time of the time keeping device comprised in the timepiece and comprising components designated by reference numerals 148–154 will be described.

An oscillating circuit 148 employing therein a crystal oscillator which oscillates at 32,768 KHz produces an oscillating frequency which is divided into the normal time keeping pulse of 1 Hz by means of a divider 149 consisting of 15 dividing steps.

The pulses put out from the divider 149 are counted by a counter 150 equipped with a plurality of counters which count 60-pulses corresponding to seconds, 60-pulses corresponding to minutes and 12- or 24-pulses corresponding to hours. The counted content of the counter 150 is converted into a code which is suitable to be displayed in the indicator 2 by means of a code converter 151.

A variable divider 152 divides the signal frequency put out from the oscillating circuit 148 into a frequency of 3KHz. The output of the variable divider 152 is put in the clock terminal of the ringcounter 147 by way of the switch $S_{143}$, and is also put in the clock terminal CL of a serial converter 153 which converts the output of the code converter 151. The serial converter 153 converts the output of the code converter 151 into the serial signal synchronizing the clock pulses put in the clock terminal CL. The serial converter 153 is provided with a hundred parallel output terminals corresponding to the row electrode Y of the indicator 2, and each of the serial signals put out by the converter 153 is put in the row driving circuit 145 by way of the switch circuit 144 when the switch $S_{141}$ (connected with the terminal to one end of which the power source voltage VDD is applied) is connected in reverse condition to that shown in the drawing.

A counter 154 provided with a terminal Q 50 generates an output whenever the pulse put out from the variable divider 152 is counted 50, and a terminal $Q_{100}$ which generates the output pulse whenever the pulse is counted 100. The output pulse from the terminal $Q_{50}$ is put in the reset terminal R of the ring counter 147 by way of the switch $S_{142}$, while the output pulse from the terminal $Q_{100}$ is put in the control terminal C of the serial converter 153. Thus the serial converter 153 begins conversion of the output of the code converter 151, and the synchronization of the serial driving of the longitudinal electrode $X_1$, $X_3$ ... $X_{99}$, $X_2$, $X_4$ ... $X_{100}$ and the serial signal corresponding thereto is actuated.

The operation of the portable electronic timepiece described above will be described next.

First the operation when the switches $S_{111}$–$S_{114}$, and the switches $S_{141}$–$S_{143}$ are in the state shown in the drawing and the TV video signal is wholly (usually) displayed on the indicator 2 is as follows:

As mentioned above, the vertical synchronizng signal which performs the interlaced scanning, included in the composite video signal of the normal TV signal in Japan, has a period of 16.66 mS for one field scanning and a frame scanning is completed by 2-field scannings. On the other hand, the vertical synchronizing signals are repeated in a period of 63.5 mS, and 262.5 signals are sent out in one field and 525 signals are sent out in one frame.

The output from the integrating circuit 114 relates to the vertical synchronizing signal and the equalizing pulse. The wave shaper 116 is designed to equalize the width of the vertical pulse and the vertical fly-back time. The vertical fly-back time is, as is known, the length in which 16 horizontal synchronizing signals are contained.

During the first field scanning period, 263-horizontal pulses are put in the 5-stage counter 124 by way of the switch $S_{112}$, while 262-horizontal pulses are put in during the second field scanning period. Actually, however, the number of horizontal pulses counted in the ring counter 124 is 247 during the first field scanning, while 246 during the second field scanning since the vertical pulse is put in the reset terminal R.

Referring now to FIG. 5, when the horizontal pulse designated as line A is put in the ring counter 124, the output terminals $a_1$-$a_5$ respectively put out a signal of logic "1" in turn with a period of 63.5$\mu$s. For instance as line B designates, the output terminal $a_2$ generates outputs when the second and the seventh horizontal pulse is put in. When the second horizontal pulse is put in and the output terminal $a_2$ is at logic "1", the gate circuit 141 passes through the 1.87 MHz clock pulse generated from the oscillating circuit 126 to the shift register 142. The gate circuit 141 opens during the period of 63.5$\mu$s, meanwhile 118 clock pulses are put in the 120-stage shift register 142 and the video signal put out from the comparator 118 is set with the clock pulse for sampling.

Since the effective scanning period of the scanning line is 53.3$\mu$s, the effective ingredients of the video signal set in the shift register 4.2 is from the 118th to the 19th.

The scanning line carries out the interlaced scanning and the second horizontal pulse after generation of the vertical pulse practically corresponds to the third scanning line. Therefore, the shift register 142 memorizes the video signal contained in the third scanning line.

The content is memorized in the portion between the 118th and the 19th step of the shift register 142 in the time that the fourth horizontal pulse is put out and the output terminal $a_4$ of the ring counter 124 changes from logic "0" to logic "1".

Meanwhile, the predetermined voltage generated from by the longitudinal driving circuit 146 is applied to the electrode $X_1$ of the longitudinal electrode X of the indicator 2 because the output of the output terminal $a_4$ is fed into the ring counter 147. The memory 143 puts out the information stored therein from the output terminal Q. Because the above mentioned memory and content is put in the row driving circuit 145 by way of the switch circuit 144, the driving voltages corresponding to the level divided into two by the comparator 118 of the video signal contained in the third scanning line are respectively applied to each of the electrodes $Y_1$-$Y_{100}$ of the row electrode Y of the indicator 2. Accordingly the indication on the electrodes $Y_1$-$Y_{100}$ which cross perpendicularly to the electrode X is in accordance with the video signal put out from the comparator 118.

When the fifth horizontal pulse is put in the ring counter 124 and the output terminal $a_5$ becomes logic "1", the shift register 142 is reset by the input of the resulting signal to the reset terminal R of the shift register 142 by way of the OR circuit 137 and the inverter 138.

Meanwhile, however, the above mentioned video signal is memorized in memory 143. In FIG. 5, line C shows the operating condition of the shift register 142 and line D shows the operating condition of the memory 143. $V_3$, $V_{13}$ designate the video signal contained in the 3rd and 13th scanning lines.

During the first field scanning period, since 247 effective horizontal pulses are put out as mentioned above, the output terminal $a_4$ of the ring counter 124 puts out 49 pulses, and the pulses are put in the above mentioned ring counter 147. Thus the longitudinal electrode X of the indicator 2 in odd numbers $X_1$, $X_3$... $X_{97}$ are driven in turn during the first field scanning period. The video signal memorized in the memory 143 when the electrode $X_{97}$ is driven corresponds, as understood by the foregoing description, corresponds to the 483th scanning line. The ring counter 124 is reset by means of the vertical pulse generated during the end of the first field scanning and the beginning of the second field scanning, while the 50-stage second counter of the ring counter 147 comes into action. Corresponding to the beginning of the second field scanning, the video signal memorized in the memory 143 is changed whenever five horizontal pulses are put out alike in the above mentioned operation, while the electrode X of the indicator 2 in even numbers $X_2$, $X_4$... $X_{98}$ is driven in turn by the operation of the ring counter 147. A sheet of the frame scanning is finished when the second field scanning is finished and the whole of the TV video signal is indicated in the indicator 2.

Next, the operation in case that the switches $S_{111}$-$S_{114}$ are closed to the respective contact points $11^c$, $12^c$, $13^c$, $14^c$ and the switches $S_{141}$-$S_{143}$ are closed in the condition shown in the drawing to display an expanded part of the video signal on the whole of the indicator will be illustrated in the case where the switches $S_{102}$, $S_{103}$ are closed respectively to the 2b and 3b contacts.

The horizontal pulses put out from the wave shaper 117 are fed to the ring counter 119 to select the vertical portion of the expanded picture as clock pulses, and the output terminal $a_{75}$ of the ring counter 119 puts out a singal of logic "1"when 75 horizontal pulses are put in from the time when the vertical pulse (reset pulse) is put out. This signal permits a signal of logic "1" to be put out from the output terminal Q of the FF 122. While the signal is logic "1", the horizontal pulse is put in the clock terminal C of the 2-stage ring counter 125 by way of the AND circuit 123. Meanwhile the gate circuit 120 passes through the horizontal pulses to the input terminal C. The ring counter 121 puts out the signal of logic "1" from the output terminal $a_{100}$ when 100-horizontal pulses are counted to reset FF 122 and the pulses from AND circuit 123 and gate circuit 120 are not put out. Thus 100-horizontal pulses from the 76th to the 175th are put in the input terminal C or the ring counter 125. Similarly, 100-horizontal pulses are put in during the second field scanning. The ring counter 125 operates basically like the ring counter 124. The output terminals $a_1$, $a_2$ of the ring counter 125 put out a signal of logic "1" in turn whenever a pair of horizontal pulses are put in.

The gate circuit 141 passes through the 4.67MHz pulse generated in the oscillating circuit 126 to the clock terminal CL of the shift register 142.

Furthermore the output terminal $a_2$ changes from logic "0" to logic "1" when the horizontal pulse is put in the ring counter 125. The memory 143 memorizes the content of the shift register 142 during the rise time as well as keeping the output thereof. Then the shift register 142 is cleared with the timing that the output terminal $a_2$ falls from logic "1" to logic "0".

Thus the upper end of the expanded portion of the video picture can be determined by the ring counter 119, while the lower end thereof can be determined by the ring counter 121. In FIG. 6, an oblique lined portion E shows the expanded portion in a vertical direction when the switch $S_{102}$ is in the state shown in the drawing (in the state closed to the side of contact 2b), and the signal applied to the other input terminal of the AND circuit 131 is logic "1".

The 4.67MHz pulse generated from the oscillating circuit 126 is put in the input terminal C of the ring counter 127. The pulse mentioned above is put in the shift register 142 up to 118 as a clock pulse of 25.4μs (about 1/2.5 times the scanning period of a scanning line) since the magnifications of the pulse is 6.25 times.

The ring counter 127 counts the pulses produced by the signal from the output terminal $a_2$ of the ring counter 125 to connect the reset terminal, and the signal of logic "1" is put out from output terminal $a_{89}$ when 89 pulses are put in from the time when the signal is set to logic "0". This signal permits the output of a signal of logic "1" from the output terminal Q of FF 129, and the ring counter 128 starts counting from the 90th pulse.

Meanwhile one of the input terminals of the AND circuit 131 (i.e. the output terminal Q of FF 129) is at logic "1". The ring counter 128 starts counting from the 90th pulse and puts out a signal of logic "1" from the output terminal $a_{118}$ when 118 pulses have been counted. FF 129 is reset by the resulting signal and the input terminal of AND circuit 131 turns to logic "0". Accordingly the output of the AND circuit 131 turns to logic "0" even if the signal of logic "1" is put out from the output terminal $a_1$ of the ring counter 125.

Thus, the bilateral expansive portion of the video picture is determined by the ring counters 127 and 128. FIG. 7 shows the expanded portion in oblique lined portion F in a horizontal direction when the output terminal $a_1$ of the ring counter 125 is constantly at logic "1" and the switch $S_{103}$ is closed to the contact 3b side.

A gate circuit 141 opens and closes under control of a signal from the output terminal $a_1$ of the ring counter 125 and the signal of the FF 129 to pass the 4.67MHz pulse from the oscillating circuit 126 to the shift register 142.

The operation of the circuit designated by the reference numerals 142–147 is similar to that for the whole (usual) display of the video picture.

FIG. 6 and FIG. 7 show, for instance, how to determine the horizontal and vertical portions on the occasion that the switches $S_{102}$ and $S_{103}$ are closed as shown in the drawings individually. Actually, however, as shown in FIG. 8 by obliquely lined portion G, the respective interlaced portion of the horizontal and vertical portions are expansively displayed in the indicator 2. Similarly, it will easily be understood that according to the present embodiment, nine kinds of expansive portions can be selected by ON-OFF operation of the switches $S_{102}$ and $S_{103}$.

Next, the performance on the occasion that the whole (normal) display and the expanded portion of the display are synchronized, by closing the switches $S_{111}$–$S_{114}$ respectively to the contacts 11b, 12b, 13b and 14b, while closing the switches $S_{102}$, $S_{103}$, $S_{141}$–$S_{143}$ to the condition shown in the drawing, will be described.

When the expanded portion is displayed, the ring counter 124 operates and the clock pulse which passes through the gate circuit 141 is 1.87MHz. The circuits designated by reference numerals 119–123 and the circuits designated by reference numerals 125–130 are operated.

However, since the signal of logic "0" is not put in the inverter 132 and the AND circuits 134 and 135, the output of the AND circuit 131 and the output of the output terminal $a_2$ of the ring counter 125 are not put in each of the input terminals of the gate circuit 141, the shift register 142 and the memory 143. Thus the video signal is displayed in the indicator 2 like the whole is displayed. The output of the AND circuit 131 is, as mentioned above, at logic "1" during the period corresponding to the portion designated by the obliquely lined portion G in FIG. 8 when the switches $S_{102}$, $S_{103}$ are closed in the state shown in the drawings. In the meantime, therefore, the signal of logic "1" is applied to one of the input terminals of the OR circuit 136 by way of the AND circuit 133, and to the shift register 142 is applied the signal of logic "1" regardless of the video signal only during the time the output of the AND circuit 131 is logic "1".

During the normal display, the black indication at a ratio of 2:1 is presented in the expanded position indication portion because of the display of the video signal of a scanning line among five scanning lines and the 2-stage ring counter 125.

Thus the expanded position can be clearly identified if the signal indicating the expanded portion in the identical indicator is applied. It will easily be understood that the magnification can be arbitrarily changed, if the oscillating frequency of the oscillating circuit 126 and the ring counter 121 is changed, although the magnification is 6.25 times according to the present embodiment.

On the other hand, it is necessary to select the circuit to determine the starting condition of the first and second counters of the ring counter 147.

Next the operation when the switches $S_{141}$–$S_{143}$ are changed into the reverse condition of that shown in the drawing to display the time according to the time keeper comprised therein, by the indicator 2 will be described.

When the switch $S_{141}$ is grounded, the switch circuit 144 is in condition to feed the output of the serial transducer 153 to the row driving circuit 145 instead of the output of the memory 143. The output of the output terminal $Q_{50}$ of the counter 154 becomes in condition to be fed into the reset terminal R of the ring counter 147 by way of the switch $S_{142}$, and the output pulse of variable divider 152 becomes in condition to be fed into the clock terminal CL of the ring counter 147 by way of the switch $S_{143}$.

The output of the counter 150 which counts the reference pulse of 131Hz put out from the divider 149 and the counting content of which designates the time, is converted into a code suitable for display by the indicator 2 by the code converter 151.

Subsequently the output is sampled by the pulse put out from the variable divider 152 and converted into a serial signal by the serial converter 153. The serial signal is supplied in turn to the row driving circuit 145 by way of the switch circuit 144. On the other hand, since the signals, identical to the pulse for sampling which is fed into the serial converter 153, are fed into the ring counter 147 in turn, the longitudinal electrode X of the indicator 2 is driven in turn synchronizing the serial signal.

The driving form of the longitudinal electrode X is like the indicative operation of said signal. Initially the electrodes in odd numbers $X_1$, $X_3$ ... $X_{99}$ are driven in turn. Subsequently the reset signals are fed into the ring counter 147 from the output terminal $Q_{50}$ of the counter 154, and the electrodes in even numbers $X_2$, $X_4$ ... $X_{100}$ are driven in turn. The code transducer 151 and the serial converter 153 are constituted so that the serial signals in accordance with the driving of the electrodes $X_1$-$X_{100}$ are put in the row driving electrode 145. The output terminal $Q_{100}$ of the counter 154 puts out the pulses corresponding to the second pulse of the output terminal $Q_{50}$, whereby the synchronization of the serial signal put out from the serial converter 153 and the timing of the driving of the longitudinal electrode $X_1$-$X_{100}$ are effected. Thus it will be understood that the time which corresponds to the counting content of the counter 150 of the time keeper is displayed in the indicator by the above operation.

Though not shown in the drawings, in case the time in the time keeping device comprised therein is displayed, switches which cut off the electric power supply to the inoperative circuits such as the receiver which receives the TV video signal are provided. Further, though not wholly shown in the drawings, in case of matrix driving of the indicator 2, circuitry is provided to prevent crosstalk (a phenomenon that a part which should not be displayed is displayed) of each of the indication points. For example, the input from the output terminal a of the switch circuit 144 to the input terminal b of the longitudinal driving circuit 4b in FIG. 4b is one of the above-mentioned examples.

The video signal from the comparator 118 is furnished with black level and white level (2 values), yet if the level is furnished with 3 or more values, a clearer picture can be obtained. Further in case of color images, the display thereof enhances the commercial value and efficacy of the present invention.

The embodiment of said time keeper is not limited to the embodiments so far illustrated and described and the efficiency of the present invention also extends to those cases that comprise additional functions which are electronic timepiece normally has, including the case that it can display the result of a time interval measurement which corresponds to the chronograph function for example.

It is obvious that although the oscillator of the time keeper and that of the TV received image display portion are distinct according to the illustrated embodiment of the present invention, the efficiency of the present invention is improved if the whole oscillating signal source is common (for example 8.388608MHz) and divided or multiplied by changeable dividing method and the required frequency is obtained.

Though not shown in the drawings, a switch may be provided to cut off the power supply to the television receiving circuitry of the equipment and the second image display circuitries when a pre-determined and preferably adjustable time is indicated by the time keeping parts of the equipment.

Further, though not wholly shown in the drawings, when the matrix of the first indicator 9 of the present invention is driven, the circuit modification to prevent cross talk (a phenomenon that an image which should not be displayed is displayed) at each of the indicative points is accomplished, when an input from the output terminal A of the switch circuit 41 is fed to the input terminal B of the driving circuit 43 in FIG. 4a.

The video signal from the comparator 20 is furnished with black level and white level (2 values), yet if the level is furnished with 3 or more values, a clearer picture can be obtained; further in case of color image, the display thereof enhances the commercial value and the efficacy of the present invention.

The invention is not limited to the particular embodiments illustrated and various modifications may be made without departing from the scope and spirit of the invention. For instance, the said image indicator may incorporate electroluminescence, or PLZT, or CED, or an electrochromic substance, or PDP or the like and, the alteration or increase in the expansive position or the magnification may be realized by partially changing the circuit.

As will now be appreciated, the portable electronic timepiece in the present invention has various advantages most of them apparent. The portable electronic timepiece comprises a television video signal receiver to indicate the received televised image on the first image indicator, so that it is possible to learn the correct time reflecting the televised time or the like on the first image indicator. Also, since the portable electronic timepiece is provided with circuitry to expansively display a part of the image on the first image indicator selectively, the desired video portion can be seen with good resolution. Further, the expansive position being selected when a part of the image is expansively displayed is indicated on the second indicator arranged oppositely to the first indicator before expansion, so that the second indicator helps to catch the selected expansive position precisely and to expansively display the desired portion quickly and precisely. Furthermore, the timekeeper is furnished with the function of the normal timepiece when the television signal is not received since the output of the time keeper can be displayed on the first indicator in place of the television signal. Thus the portable electronic timepiece has various advantages and fully attains the predetermined objects and also practical advantages.

In one feature of the present invention, since a receiving portion is disposed to receive the television video signal, the received television video signal can be displayed on the image indicator. Therefore the correct time can be determined by observing the time being telecast on the image indicator.

Another feature of the present invention is the same as the preceding feature wherein the circuits which expand the image displayed in the image indicator, selectively display a portion of the image in the whole of the indicator. Therefore only the desired video portion can be seen with good resolution. Moreover, when a part of the image is image expansively, it is possible to observe the selected expansive portion correctly and quickly since the position of the expansive portion is simultaneously indicated on the normal video picture.

What is claimed:

1. A portable electronic timepiece comprising electronic time-keeping means including means for producing reference pulses and means for counting said pulses to obtain a time signal, means for receiving a television video signal, indicating means for selectively visually displaying an image of said television video signal and said time signal and means for expanding a selected portion of said television video signal image for display by said indicating means, said indicating means including means for visually indicating the position of a portion of said television video signal image that is expanded.

2. A portable electronic timepiece according to claim 1, in which said indicating means comprises first display means for displaying all or an expanded portion of said image of said television video signal and said image of said time signal and second display means for visually indicating the position of a portion of said television video signal image that is expanded.

3. A portable electronic timepiece according to claim 2, in which said first display means comprises a grid of crossed horizontal and vertical electrodes and a layer of material disposed between said electrodes and visually activated by coincident energization of horizontal electrodes and vertical electrodes.

4. A portable electronic timepiece according to claim 2, in which said second display means comprises selectively visually activatable display elements arranged in a pattern to outline different portion of the display area of said first display means.

5. A portable electronic timepiece according to claim 1, in which said timepiece is a wrist watch and said indicating means comprises the face of said wrist watch.

* * * * *